(12) United States Patent
Radhakrishnan

(10) Patent No.: US 8,998,334 B2
(45) Date of Patent: Apr. 7, 2015

(54) HEAD SUPPORT THAT CAN BE MOVED IN THE X DIRECTION

(75) Inventor: Prashanth Radhakrishnan, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 57 days.

(21) Appl. No.: 13/819,535

(22) PCT Filed: Aug. 29, 2011

(86) PCT No.: PCT/EP2011/004317
§ 371 (c)(1),
(2), (4) Date: May 10, 2013

(87) PCT Pub. No.: WO2012/031701
PCT Pub. Date: Mar. 15, 2012

(65) Prior Publication Data
US 2013/0229043 A1    Sep. 5, 2013

(30) Foreign Application Priority Data

Sep. 6, 2010   (DE) .......................... 10 2010 044 448

(51) Int. Cl.
| | |
|---|---|
| A47C 1/10 | (2006.01) |
| A47C 7/36 | (2006.01) |
| A61G 15/00 | (2006.01) |
| B60R 22/28 | (2006.01) |
| B60N 2/48 | (2006.01) |
| A47C 7/38 | (2006.01) |
| F16H 19/02 | (2006.01) |

(52) U.S. Cl.
CPC ................ *B60N 2/4864* (2013.01); *A47C 7/38* (2013.01); *F16H 19/02* (2013.01)

(58) Field of Classification Search
USPC ............ 297/391, 216.12, 408, 400, 403, 409, 297/402, 406, 407
See application file for complete search history.

(56) References Cited

U.S. PATENT DOCUMENTS

| | | | | |
|---|---|---|---|---|
| 4,576,413 | A | * | 3/1986 | Hatta ............................ 297/408 |
| 4,600,240 | A | * | 7/1986 | Suman et al. ................ 297/408 |
| 4,678,232 | A | * | 7/1987 | Ishida et al. .................. 297/408 |
| 5,738,412 | A | * | 4/1998 | Aufrere et al. ............... 297/408 |
| 6,000,760 | A | * | 12/1999 | Chung .......................... 297/408 |
| 6,511,130 | B2 | * | 1/2003 | Dinkel et al. ................ 297/410 |
| 6,880,889 | B2 | * | 4/2005 | Lomagno et al. ............ 297/408 |
| 6,890,028 | B2 | * | 5/2005 | Pal et al. .................. 297/216.12 |
| 2010/1027541 | | | 5/2010 | Kotz |

FOREIGN PATENT DOCUMENTS

| | | |
|---|---|---|
| DE | 10012973 A1 | 9/2001 |
| DE | 102009038631 A1 | 5/2010 |

OTHER PUBLICATIONS

International Search Report and Written Opinion for PCT No. PCT/EP2011/004317 dated Mar. 21, 2013; 8 pgs.
International Search Report for application No. PCT/EP2011/004317 mailed Aug. 29, 2011.

* cited by examiner

*Primary Examiner* — Chi Q Nguyen
(74) *Attorney, Agent, or Firm* — Fletcher Yoder, P.C.

(57) ABSTRACT

The invention relates to a head support comprising a head support case that can be moved in relation to at least one stay bar in the X direction. The invention also relates to a locking system.

6 Claims, 7 Drawing Sheets

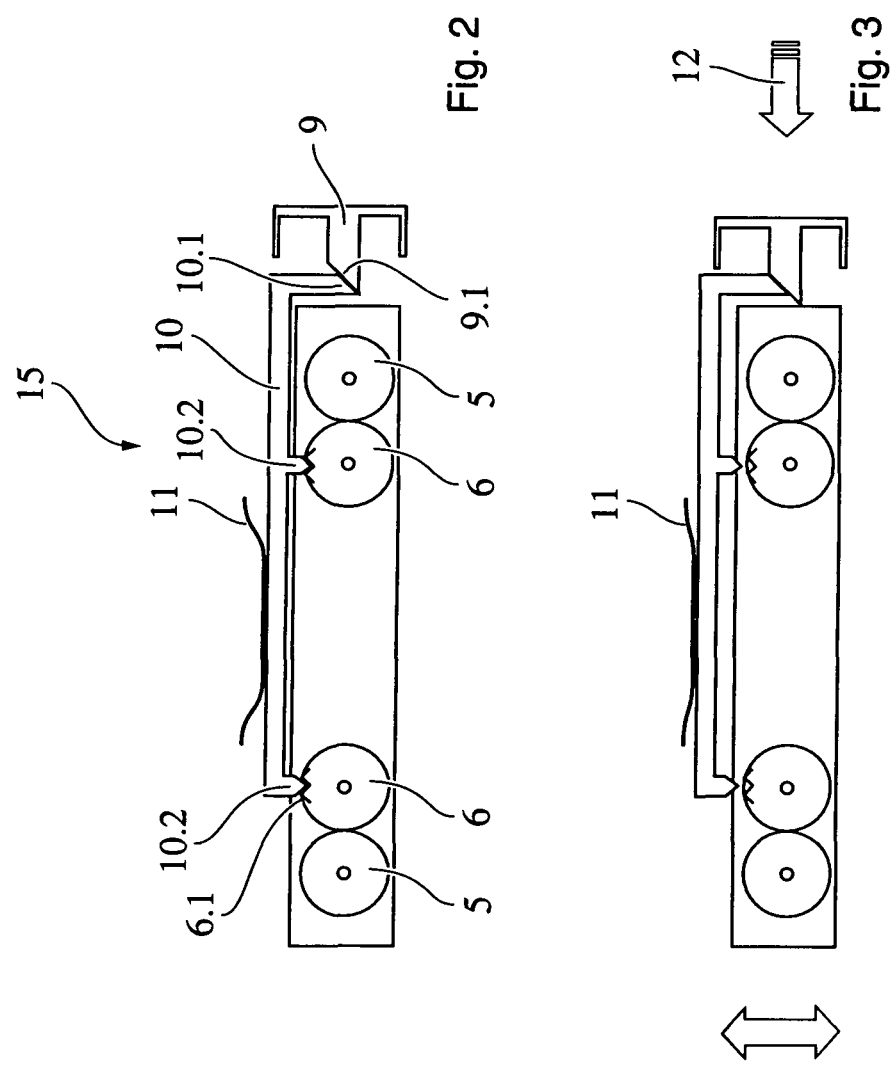

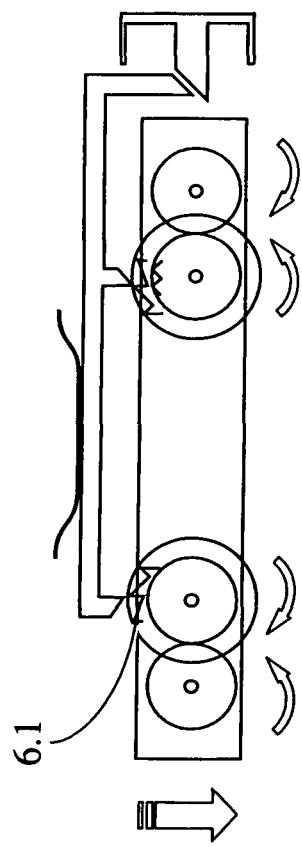
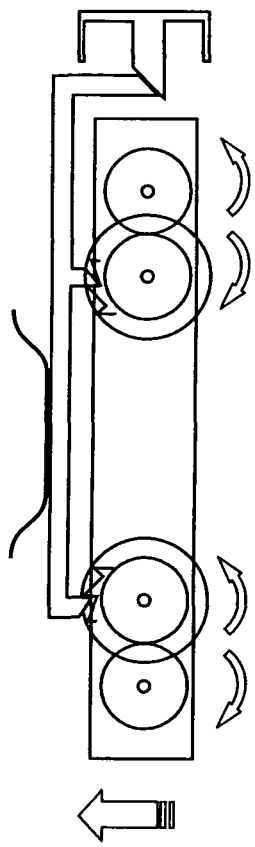
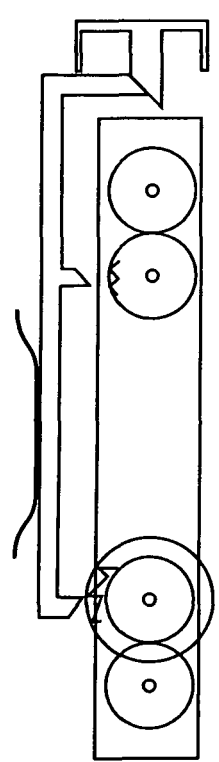
Fig. 4
Fig. 5
Fig. 6

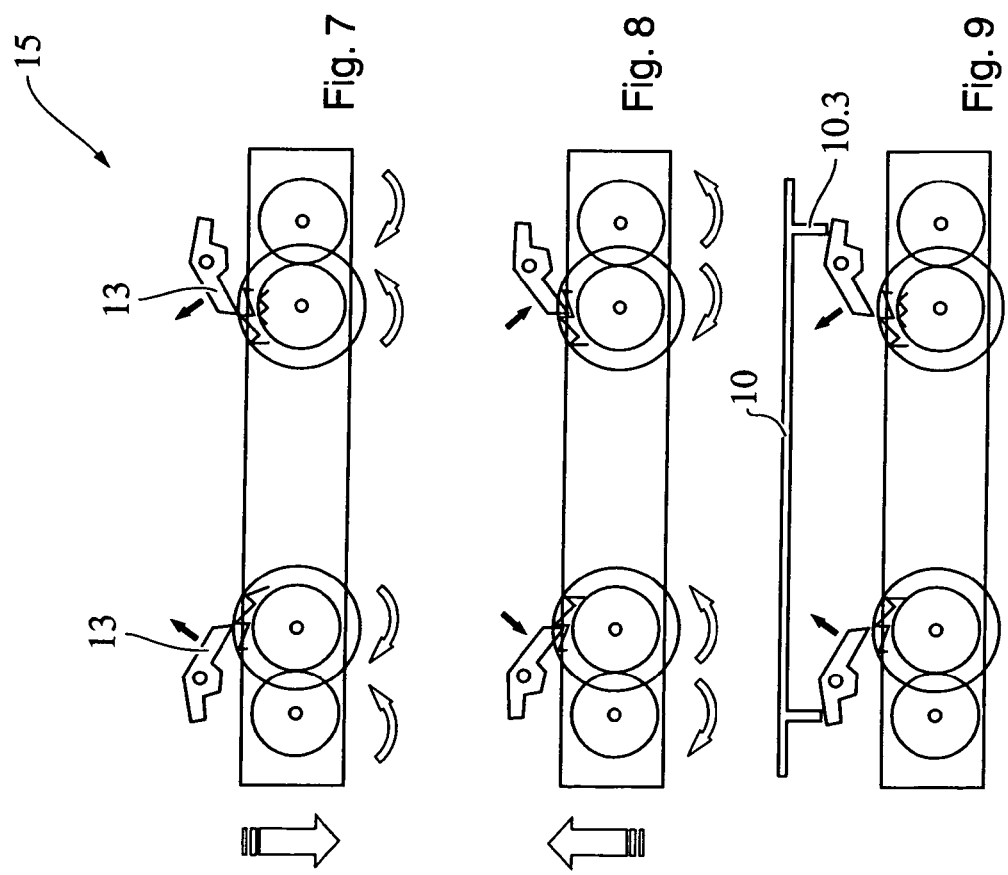

US 8,998,334 B2

HEAD SUPPORT THAT CAN BE MOVED IN THE X DIRECTION

CROSS REFERENCE TO RELATED APPLICATIONS

This application claims priority from the benefit from and the benefit of PCT Application No. PCT/EP2011/004317, filed on Aug. 29,2011; and German Patent DE 10 2010 044 448.0, filed on Sep. 6, 2010; both entitled "Head Support that can be Moved in the X Direction", which are herein incorporated by reference.

BACKGROUND

The present invention relates to a head support with a head support box which is provided so as to be displaceable in the X direction relative to at least one holding bar. Furthermore, the present invention relates to a locking system.

The head support of the type in question is well known from the prior art. A head support of this type is movable in the X direction, i.e. with the head contact surface toward the seat occupant's head and away therefrom for comfort purposes or for safety reasons. Head supports of this type have to be manufactured and operated in a simple manner. In particular, it has to be ensured that the head support box does not tilt during the movement thereof.

It was therefore the object of the present invention to provide a head support which can be produced and handled safely.

The object is achieved by a head support with a head support box that is displaceable in the X direction relative to at least one holding bar, wherein the head support box has an interlocking and/or frictional means on opposite outer walls and has in each case two interlocking and/or frictional means on at least one inner wall, and in that a first and a second pinion are arranged between in each case two interlocking and/or frictional means, said pinions respectively engaging with one interlocking and/or frictional means and meshing with each other.

SUMMARY

The present invention relates to a head support which is provided with one, preferably two, holding bars, for example on the backrest of a vehicle seat or on the bodywork of a vehicle. Head supports of this type are preferably provided to be height-adjustable and/or inclination-adjustable in order to be adaptable to the height of the seat occupant.

The head support according to the invention has a head support box that can be moved in the X direction, i.e. towards the occupant's head or away therefrom, relative to the holding bar or the holding bars. The head support box is preferably blocked in the respectively desired position at least in one direction.

According to the invention, the head support box has outer walls, for example six outer walls. Interlocking and/or frictional means, for example in the form of racks, are in each case provided internally on two of said outer walls, preferably on two outer walls which are parallel to the X direction and which are particularly preferably oriented substantially vertically.

Furthermore, according to the invention, the head support box internally has two additional interlocking and/or frictional means which are arranged on at least one, preferably two inner walls. Said interlocking and/or frictional means are preferably arranged parallel to the interlocking and/or frictional means on the outer wall.

Two pinions are in each case arranged between an interlocking and/or frictional means arranged on the outer wall and an interlocking and/or frictional means arranged on the inner wall, said pinions respectively engaging with an interlocking and/or frictional means on the outer or inner wall and meshing with each other. The head support according to the invention consequently preferably has at least four pinions. The pinions preferably have the same diameter and the same number of teeth.

It is thus ensured that the head support box carries out an absolutely parallel movement to the head support bars and cannot tilt.

According to a further subject matter according to the invention or preferred subject matter of the present invention, at least one stabilizing means is provided in the head support box, said stabilizing means being rotationally mounted on a holding bar and having a slot-shaped recess which receives the other holding bar. It is possible by means of said stabilizing means to support the head support box, in particular in extreme positions thereof.

The head support preferably has two stabilizing elements which are provided vertically spaced apart from each other. Preferably, one stabilizing element is provided at the upper end of the head support box and one at the lower end thereof. The stabilizing elements are preferably provided in such a manner that they rotate in an opposed manner.

The head support preferably has a locking means which locks the head support in the particular position at least in one direction of movement.

A further subject matter of the present invention is a system having a locking means which is provided in a positionally fixed manner and has two wings which are provided rotatably about an axis of rotation, and has a spring means which pushes the wings apart, wherein said wings interact in an interlocking and/or frictional manner with interlocking and/ or frictional means of a component, which is provided in a longitudinally displaceable manner relative to the locking means.

The component preferably has a folding means which compresses the wings in an end position of the component.

The component furthermore preferably has a guide means which optionally keeps the wings together.

DRAWINGS

The invention is explained below with reference to FIGS. 1-12. Said explanations are merely by way of example and do not restrict the general inventive concept. The explanations apply equally to all subject matter of the present invention.

FIGS. 2-6 show a first embodiment of a locking means.

FIGS. 7-9 show a second embodiment of a locking means.

DETAILED DESCRIPTION

Figure 1:
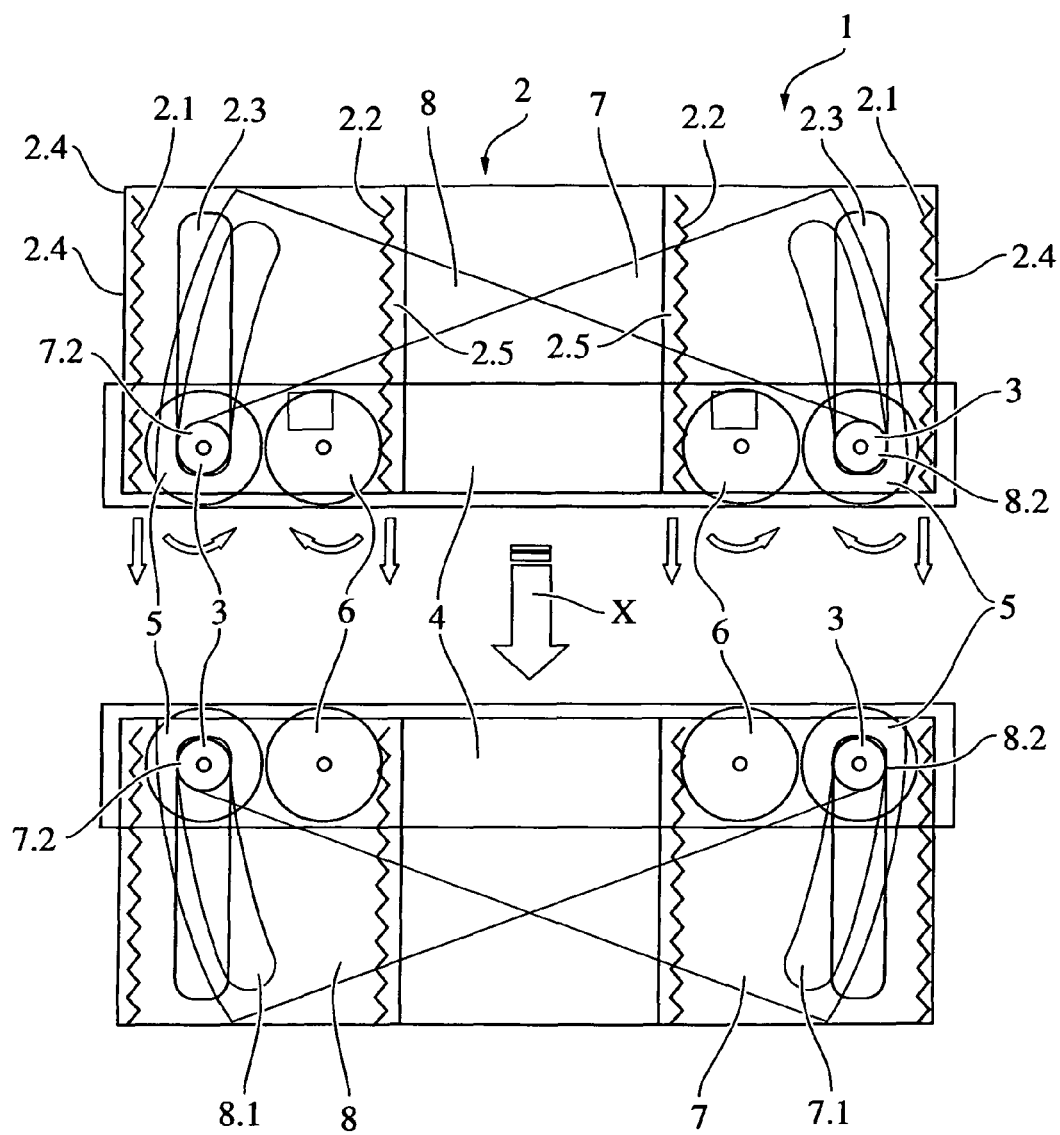
FIG. 1 is shows an embodiment of the head support according to the invention.

FIG. 1 shows a first embodiment of the head support 1 according to the invention. The latter has a head support box 2 that is displaceable in the X direction relative to two holding bars 3 for comfort or safety purposes. For this purpose, the head support box is provided with a slot 2.3 per holding bar.

The head support box has six outer walls 2.4, wherein the two outer walls 2.4 which are provided parallel to the X direction and vertically here, both have interlocking and/or frictional means 2.1, for example in the form of teeth, internally. Furthermore, the head support box internally has two inner walls 2.5 which are arranged parallel to the outer surfaces 2.4, which are provided with the means 2.1, and which have interlocking and/or frictional means 2.2 on the surface thereof opposite the means 2.1. A person skilled in the art will see that one inner wall may also be sufficient, the inner wall then having interlocking and/or frictional means 2.2 on two sides of the surface thereof. Two pinions are in each case provided between in each case two means 2.1, 2.2, said pinions respectively engaging with a means 2.1, 2.2 in an interlocking and/or frictional manner and meshing with each other. The pinions 5, 6 are provided rotatably, but in a positionally fixed manner here, on a plate 4, which is preferably mounted on the holding bars 3. If the head support box 2 is then moved relative to the holding bars 3 or to the gate 4, the pinions rotate in an opposed manner, as illustrated by the arrows, and mesh with the means 2.1, 2.2. This ensures an absolutely parallel movement of the head support box relative to the holding bars.

Furthermore, it can be seen that the head support according to the invention has a first and a second stabilizing element 7, 8 which are configured here in the shape of pieces of cake. In each case one end 7.2, 8.2 of the stabilizing elements is arranged rotatably on in each case one holding bar 3. Furthermore, each stabilizing element has a slot 7.1, 8.1 which is provided in the shape of an arc of a circle and in each case receives one holding bar 3. In the two illustrations according to FIG. 1, the head support is in each case illustrated in extreme positions thereof. By displacement of the stabilizing elements 7, 8 during the movement in the X direction, the head support is in each case optimally supported in the two extreme positions thereof. Preferably, one stabilizing element is provided in the upper region within the head support box and one stabilizing element is provided in the lower region within the head support box. The head support box is customarily cushioned on the outside and covered with a cover.

FIGS. 2 to 6 show a first embodiment of a locking element 15 which locks the head support box 2, according to FIG. 1, in the respective position thereof. For this purpose, a locking means 15 has a linkage 10 on which interlocking means 10.2 are arranged, said interlocking means engaging in the teeth 6.1 of the pinion 6 and preventing the latter from rotating. It is ensured by means of a spring means 11 that the interlocking means 10.2 is in engagement with the pinion 6. In order to release the lock, a compressive force 12 is exerted, as illustrated in FIG. 3, on an actuating means 9 which is thereby displaced to the left. The actuating means 9 has a slope 9.1 which interacts with a slope 10.1 arranged on the linkage 10. By means of the movement of the actuating means 9 to the left, the linkage 10 is disengaged from the pinions 6 counter to the force of the spring means 11 and the head support box can freely move. FIGS. 4-6 substantially illustrate the embodiment according to FIGS. 2 and 3, only in that, in the present case, the interlocking means 6.1 of the pinions 6 are configured in such a manner that the pinions can freely rotate in the clockwise direction without the actuating means 9 being pressed. This ensures that the head support box can be pulled, for example in the direction of the seat occupant's head, without the actuating means 9 being pressed. A displacement of the head support box away from the occupant's head as illustrated in FIG. 5, is normally locked, and therefore the head support box does not automatically move out of the desired position, for example in the event of a rear impact. A movement of the head support box away from the occupant's head is possible only if a compressive force is exerted on the actuating means 9, as illustrated in FIG. 6.

In the locking means 15 according to FIGS. 7 to 9, the movement of the pinion 6 is in each case blocked by a pawl 13 which is provided rotatably about a pivot point. Said pawl and the configuration of the interlocking means 6.1 commit a movement toward the occupant's head without the locking means having to be released, this being illustrated in FIG. 7. By contrast, a movement away from the seat occupant's head is blocked, as can be seen in FIG. 8. As illustrated in FIG. 9, the respective pawl 13 can be moved away from the interlocking means 6.1 by means of a linkage 10 such that said interlocking means can freely rotate and the head support box can move freely in the X direction.

Figure 10:
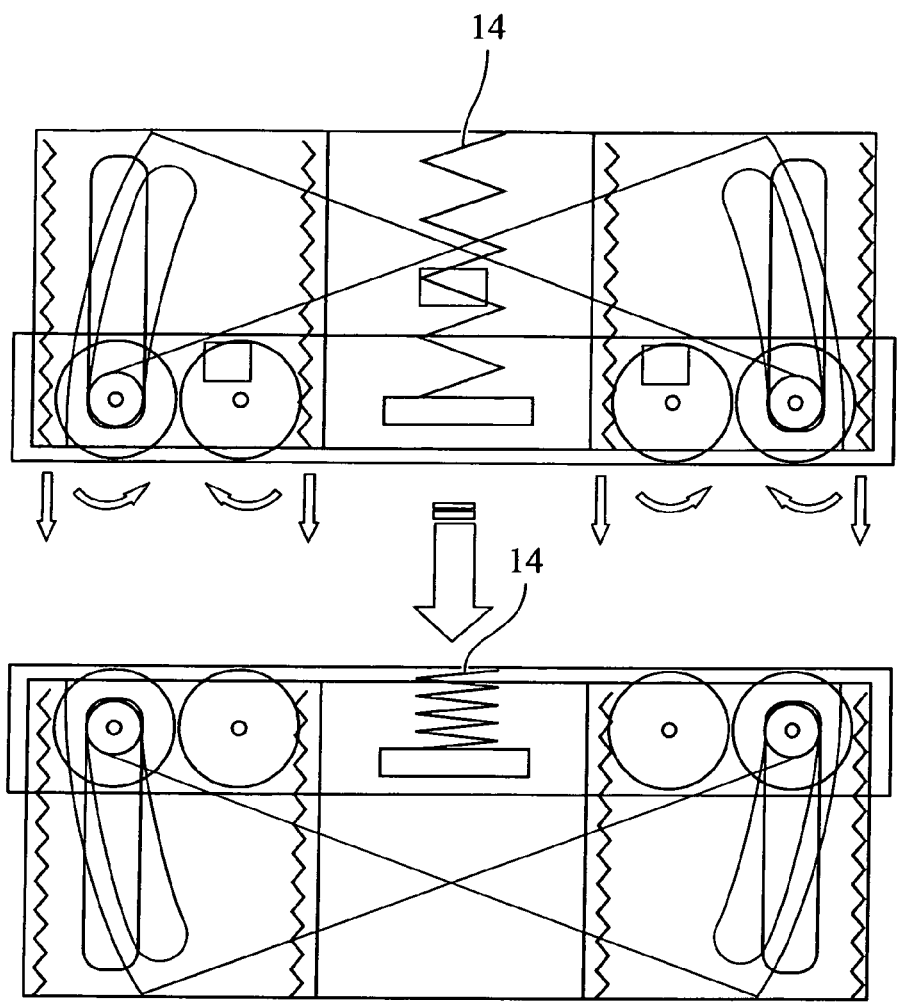
FIG. 10 shows the head support according to FIG. 1 with a spring means.

FIG. 10 shows a further embodiment of the head support according to the invention that substantially corresponds to the embodiment according to FIG. 1, wherein, in the present case, a spring means 14 is provided, the spring means being tensioned upon movement of the head support box toward the seat occupant and thereby assisting the movement of the head support away from the seat occupant.

Figure 11:
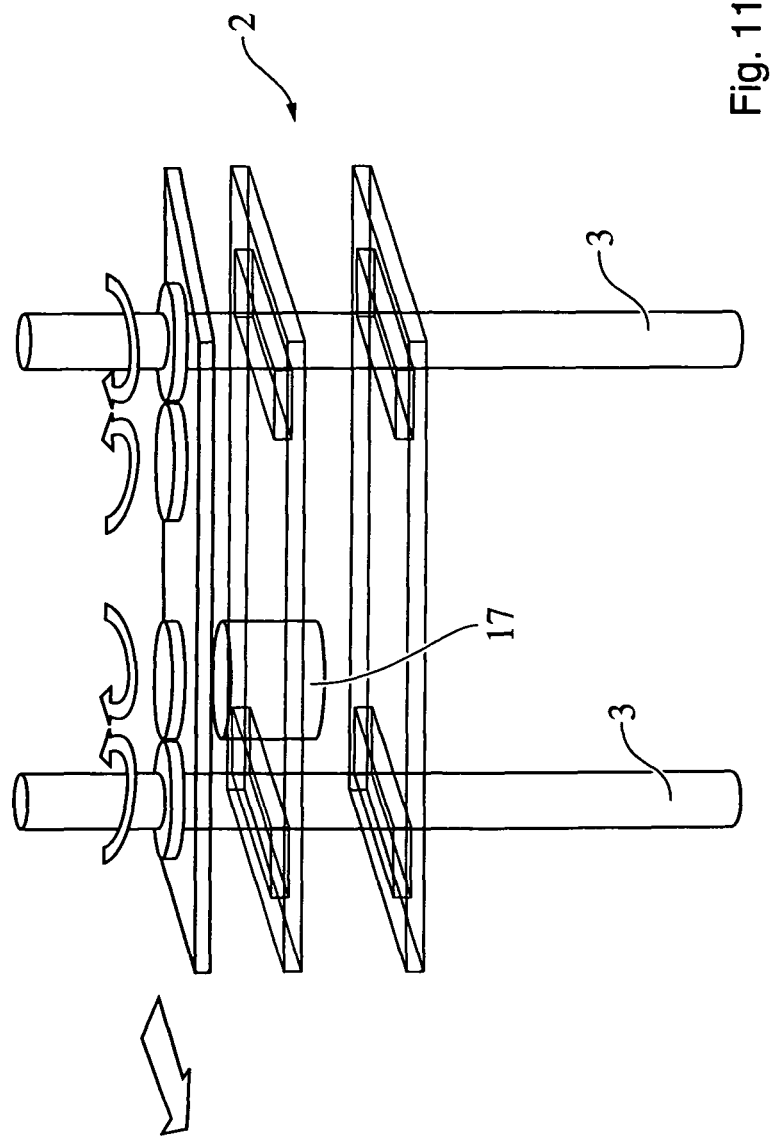
FIG. 11 shows a head support with a motorized drive.

FIG. 11 shows schematically a further embodiment of the head support according to the invention. In the present case, one of the pinions 5, 6, preferably the pinion 6, is driven by a motor 17 which is preferably provided in the head support box 2 and thereby adjusts the head support box 2. It is sufficient only to drive one of the two pinions 6.

Figure 12:
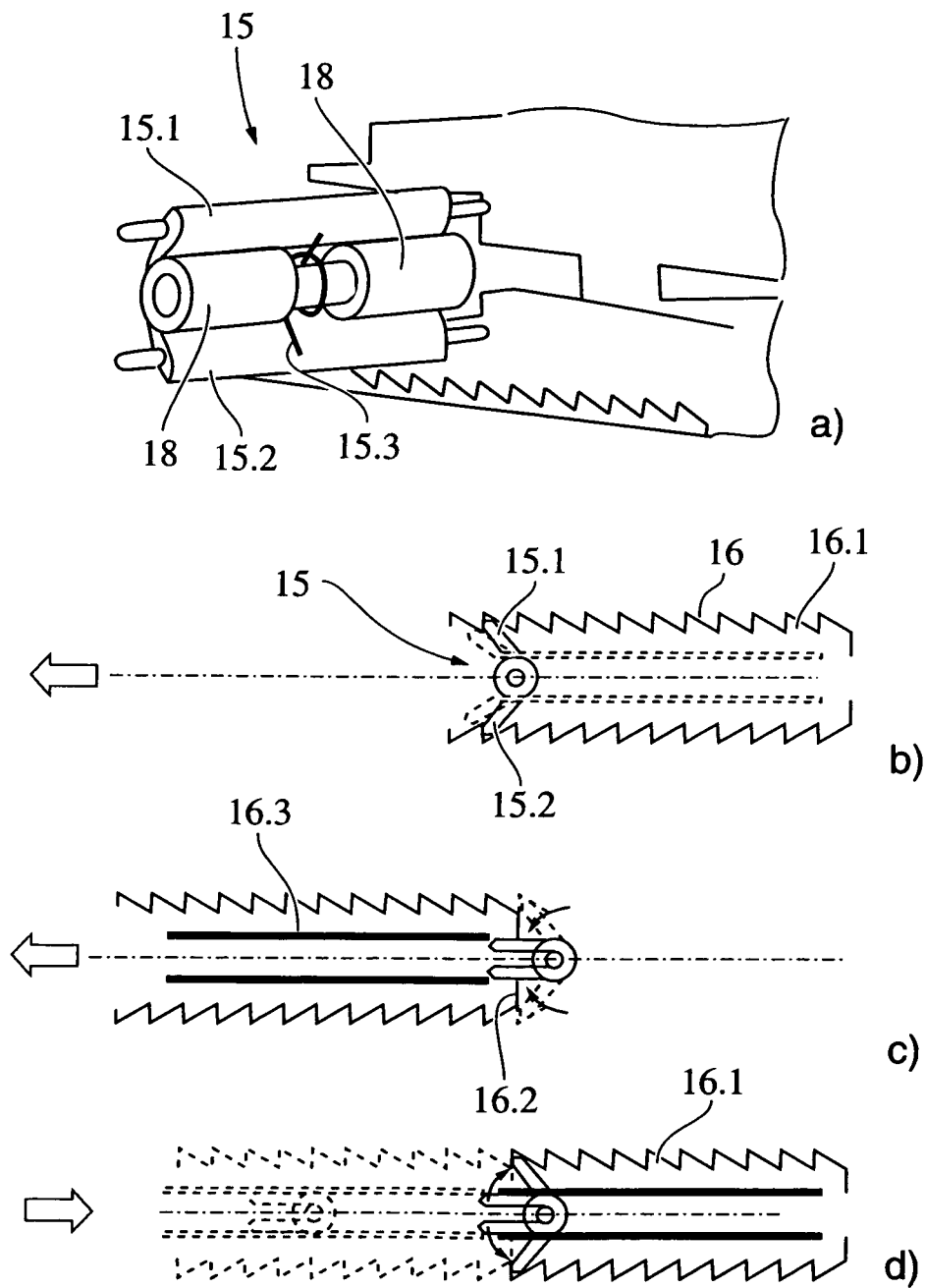
FIG. 12 shows the system according to the invention.

FIG. 12 shows the system according to the invention. The latter consists of a locking means 15 which has at least one hinge, here two hinges 18, as a result of which two wings 15.1, 15.2 are provided so as to be rotatable relative to each other. The two wings 15.1, 15.2 are pushed apart by means of a spring means 15. As can be gathered in particular from FIG. 12b, the wings 15.1, 15.2 each interact with interlocking means 16.1 of a component 16, for example of a head support box, and prevent said component from being able to move in one direction, here to the right, while the component is provided so as to be movable to the left. As soon as the component 16 has taken up its left extreme position, which is illustrated in FIG. 12c, the wings 15.1, 15.2 interact with a folding means 16.2, which is provided on the component 16, and fold the two wings in such a manner that the engagement thereof with the interlocking means 16.1 is cancelled and they fit into a guide means 16.3. Said guide means keep the wings 15.1, 15.2 together such that they interact with the interlocking means 16.1 in a non-latching manner upon movement of the component 16 to the right, which movement is illustrated in FIG. 12d. As soon as the component 16 has reached its right extreme position, the guide means 16.3 is, for example, moved away and the wings are again rotated apart by the spring means 15.3 and interact again in a latching manner with the interlocking means 16.1.

The invention claimed is:
1. A head support comprising:
a head support box that is displaceable in an X direction relative to at least one holding bar, wherein the head support box has one interlocking or frictional device on both of two opposite outer walls and has two interlocking or frictional devices on at least one inner wall, the at least one inner wall is positioned laterally inward from the outer walls and extends substantially parallel to the outer walls, first pinion and a second pinion are arranged between two interlocking or frictional devices, each pinion is configured to rotate about an axis substantially parallel to the at least one holding bar, and the pinion engages with one respective interlocking or frictional device and meshes with the one respective interlocking or frictional device.

2. The head support as claimed in claim 1, wherein at least one stabilizing element is provided in the head support box, the stabilizing element being rotationally mounted on one holding bar and having a slot-shaped recess which another holding bar.

3. The head support as claimed in claim 2, comprising two stabilizing elements vertically spaced apart from each other.

4. The head support as claimed in claim 3, wherein the stabilizing elements are arranged in an opposed manner.

5. The head support as claimed in claim 1, comprising a locking device.

6. The head support of claim 1, wherein each interlocking or frictional device extends along a substantially linear path.

* * * * *